March 21, 1933.  S. P. VAUGHN  1,901,881
THERMOSTAT
Filed Dec. 1, 1930
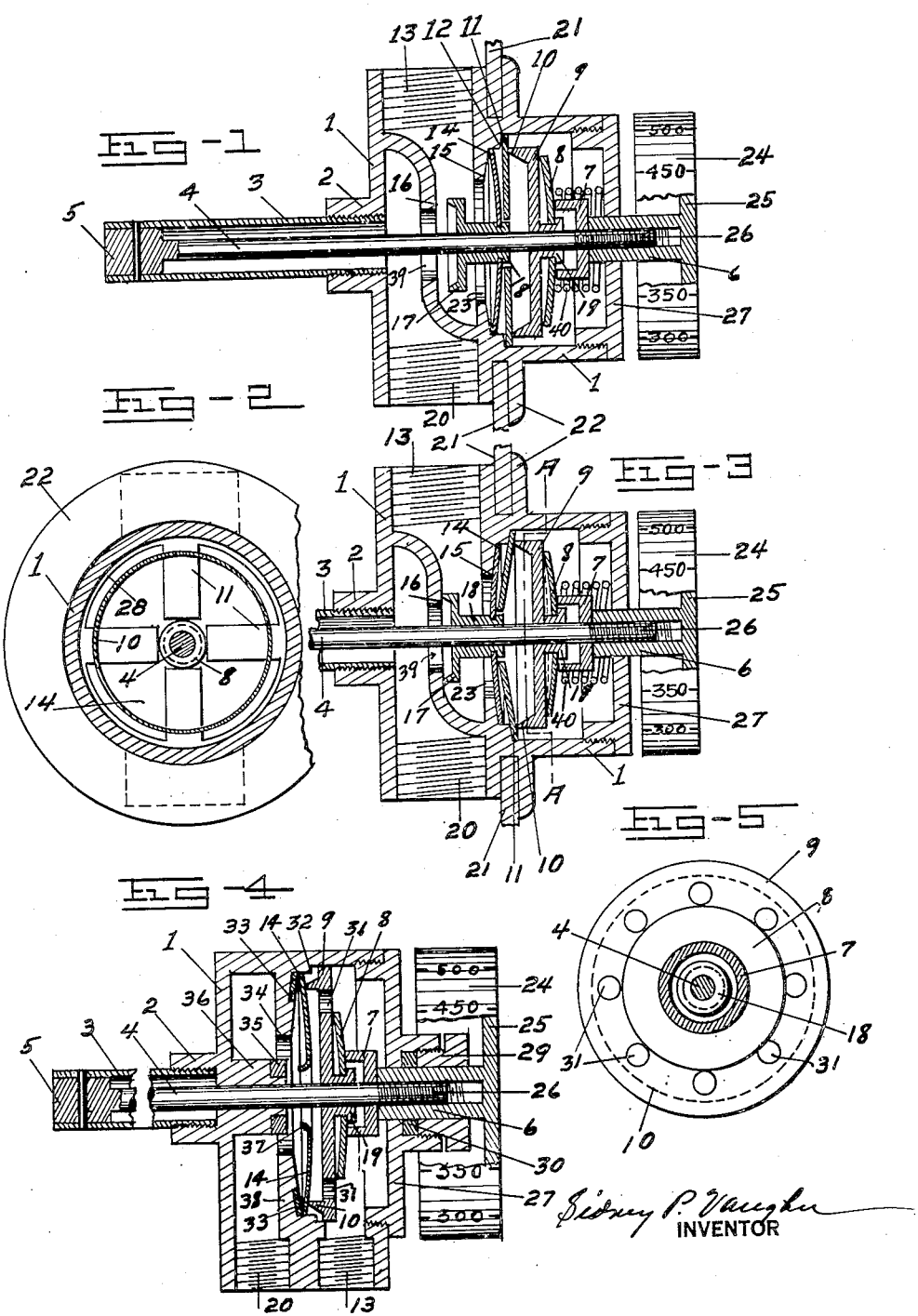
Sidney P. Vaughn
INVENTOR Patented Mar. 21, 1933

1,901,881

UNITED STATES PATENT OFFICE

SIDNEY P. VAUGHN, OF THE UNITED STATES NAVY, OF ACKERMAN, MISSISSIPPI, ASSIGNOR TO GRAYSON HEAT CONTROL, INC., OF LYNWOOD, CALIFORNIA, A CORPORATION OF CALIFORNIA

THERMOSTAT

Application filed December 1, 1930. Serial No. 499,243.

(GRANTED UNDER THE ACT OF MARCH 3, 1883, AS AMENDED APRIL 30, 1928; 370 O. G. 757)

I agree that the invention may be manufactured and used by or for the Government for governmental purposes without the payment to me of any royalty thereon.

This invention relates to thermostats adapted to regulate the temperature of ovens, water heaters and similar devices in which a wide range of temperature regulation is desired. The invention is more particularly applicable to thermostats of the snap action type employing what is known as a clicker disk or over center spring disk actuated by thermal responsive elements to open and close the valve with a snap action, such as described in Patent No. 1,699,468 issued January 15, 1929, and Patent No. 1,744,465 issued January 21, 1930, to J. H. Grayson, to which reference may be made for a more detailed description of the general principles involved. While the thermostats disclosed in the above patents operate efficiently and satisfactorily on hot water heaters where the temperature range is very low, they are not satisfactory for ovens where the temperature range is high and only a small temperature variation is allowable. It is therefore necessary to provide some means to allow the thermostatic elements to expand the full temperature range or contract the full temperature range without causing abnormal strains in the movement amplification and snap acting mechanism.

The principal object in this invention is to provide in thermostats of the type described a very inexpensive and simple device whereby the temperature range may be greatly increased without causing abnormal strains that would prevent the thermostat functioning properly.

A further object is to provide a novel means for regulating the opening and closing of the valve according to temperature requirements where it is desired that the regulating device be on the outside of the oven and present a neat appearance.

Another object is to provide a thermostat of the type described in the above patents wherein the valve actuating mechanism is arranged in the cool side of the valve body away from the direct action of the heat, thus avoiding the possibility of changing the temper of any spring elements.

Another object is to provide a very simple valve construction in thermostats of the type described in the above patents wherein the clicker disk is utilized as the valve for opening and closing the valve port.

The foregoing, together with such other objects as may hereinafter appear, or, are incident of my invention, I obtain by means of a construction described herein and illustrated in the accompanying drawing wherein:

Fig. 1 is a central longitudinal section through a thermally controlled gas valve made in accordance with my invention and showing the position of the parts when the valve is open. Fig. 2 is a cross section of the valve body on lines A—A, Fig. 3. Fig. 3 is the same as Fig. 1 except that it shows the valve closed. Fig. 4 is a central longitudinal section through a modified form of my invention. Fig. 5 is a cross section through the cup 7 of Fig. 4, showing the assembled spring disk and plunger in plan view.

Similar reference numbers apply to corresponding parts throughout the several views.

The thermostat illustrated and embodying my invention employs the general features of the snap acting mechanism described in the above named patents and comprises the usual thermal responsive elements consisting of a tube 3 having a high coefficient of expansion, such as copper, which has mounted therein a rod 4 having a low coefficient of expansion, such as invar. The tube 3 has one end fixed in the bore of a neck extension 2 of what will be termed the inner end of the valve body 1. The rod 4 is mounted in the tube by having one end fixed to a plug 5 secured in the free end of the tube. The rod passes through the tube and valve body and the outer end 26 is threaded to receive an adjustment device consisting of an internally threaded sleeve 6 connected to a wide rim wheel 25 carrying a band scale 24 graduated in degrees. By virtue of this connection it is evident that any expansion and contraction of the tube 3 results in an inward and outward movement of the sleeve 6 and the end of the rod 4.

The valve body 1 has an inlet 13 which may be connected to the gas supply and an outlet 20 which may be connected to the burner. The outlet and inlet passages are separated by a wall 16 in which is formed a valve port 39 that is opened or closed by a poppet or mushroom type valve 17 movable to and from its seat by a normally concavo-convex (looking at drawing from left to right) spring metal diaphragm 14 called a clicker disk. The clicker disk is arranged to snap over dead center from a concavo-convex form when a pressure is applied to the convex side thereof and to regain its normal concavo-convex form when the pressure is removed. The disk is arranged to rest loosely on an annular shoulder 15 which forms a partition having a circular opening therein between the inlet side of the valve and a circular chamber formed in an outward extension of the valve body in which the valve actuating mechanism is arranged. The shoulder 15 is rather broad and is beveled to conform to the contour of the disk when snapped into a convexo-concave form, to relieve the disk of any abnormal strains, The longitudinal axis of the non-expanding thermostatic rod 4 forms the longitudinal axis of the valve body. The rod passes entirely through the valve body and acts as a central guide rod upon which the entire valve actuating and adjustment mechanism is concentrically assembled. The valve 17 has a hollow stem 18 slidably mounted on the rod 4 and which is actuated in both directions by the clicker disk 14. The clicker disk has a central opening in which the neck of the valve stem is loosely mounted to obtain a free movement, but sufficiently tight to prevent leakage of gas.

The clicker disk is actuated by the endwise movement of the rod 4 and in order to make the valve sensitive to temperature changes the movement of the thermostatic rod is amplified by arranging in the order named on the thermostatic rod between the sleeve 6 and the clicker disk 14, a plunger 9 and resilient levers 11. The plunger 9 has a central stem 19 bored to slide freely over the rod 4. The face of the plunger 9 presented to the levers 11 has a projecting annular knife edge shoulder 10 arranged to have line contact with the levers 11 near the outer ends thereof. The levers 11 are arranged radially and are stamped from a single piece of metal with the outer ends of the levers connected by a ring 28 as illustrated in Fig. 2. The outer ends of the levers bear against an annular beveled shoulder 12 defining a slight increase in the bore of the chamber from the valve outward.

The inner ends of the levers press against the convex side of the clicker disk near the center thereof and are arranged to apply a pressure at that point to cause the disk to snap over dead center to a concavo-convex form. Since the levers are borne against by the plunger 9 at points near the outer ends it will be evident that the levers will have a rocking motion communicated thereto in the movement of the rod 4. The annular shoulder 10 of the plunger has practically the same diameter as the inner edge of the shoulder 12 and the bevel of the shoulder is equal to the angle through which the levers must swing to actuate the valve to a closed position. This arrangement is necessary to limit the travel of the plunger 9 and prevent abnormal stresses being set up in the levers 11 and the clicker disk 14. It will be noted that after the plunger has moved the distance necessary to move the levers through an angle necessary to close the valve, any further movement is stopped by the annular shoulder 12.

A concavo-convex disk spring 8 is partially compressed and attached to the back of the plunger with the concave side toward the plunger by passing the plunger stem 19 through a central opening in the disk spring and flanging the end of the stem over the convex side of the disk. Endwise movement of the rod 4 is transmitted to the convex side of the disk spring 8 through the intermediary of a cup shaped member 7 centrally drilled and slidably mounted on the rod 4 with the bottom in contact with the adjustable sleeve 6 and the edge of the cup in contact with the convex side of the disk 8. The tension in the compressed disk spring 8 is sufficient to prevent any further compression until the clicker disk has been actuated to close the valve. After the valve has been closed any further inward movement of the adjustment sleeve 6 compresses the disk spring 8 without moving the plunger 9, as shown by the dotted lines in Fig. 3. To illustrate, assume that it takes a pressure of 50 lbs. to close the valve and that it takes 60 lbs. to compress the disk spring 8. When the member 7 begins to exert a pressure on the convex side of the disk spring it is evident that the disk spring will resist compression until the valve is closed, after which the spring compresses to allow for any further inward movement of the adjustment sleeve 6. The disk type of spring is selected for the reason that it takes a greater pressure to start the collapse of the spring than it does to continue the collapse. In other words, the pressure necessary to compress the disk decreases as the disk flattens out.

The value of the disk spring 9 may be readily appreciated by the following example; assume that the wheel 25 is turned anti-clockwise until the scale reading is say 400 degrees and that the thermostatic tube 3 has expanded a distance sufficient to close the valve as illustrated in Fig. 3. It is evident that the plunger 9 cannot be moved any further toward the valve. Now assume that it is desired to set the scale to 200 degrees in order to lower the temperature of the oven. To do this the wheel 25 must be moved clockwise which causes the cup member 7 to be moved inward toward the plunger. Since the plunger cannot be moved any further inward, the disk spring is compressed to allow for the inward movement of the cup, otherwise strains would be set up which might distort or break some part and throw the thermostat out of working order.

A coiled compression spring 40 acting between the disk spring 8 and the plug 27 in the end of the valve body is provided to take up any lost motion in the transmission train and to keep the clicker disk pressed gas tight against its seat.

In Figs. 4 and 5 is illustrated a modified form of construction in which the clicker disk 14 is utilized as a valve to open and close the valve port 34, thus eliminating the valve and the valve stem arrangement disclosed in Fig. 1. In this construction the valve body 1 is cylindrical in form with a central bore transversely divided into two chambers by a partition 38 which separates the inlet side 13 from the outlet side 20, and which has a large circular opening therethrough to form the valve port. The inlet side of the partition 38 is concave in form to conform to the contour of the disk 14 when snapped into a reverse form. At the juncture of the wall on the inlet side of the partition 38 with the inner wall of the valve body 1 an annular groove 33 is formed to receive a hard ring packing on which rests the outer edge of the clicker disk and which forms a gas tight seat to prevent leakage of gas when the valve is closed. The center of the clicker disk has an opening therein, the edge of which is cupped to form a lip 37 on the normal concave side of the disk, and arranged to make a sharp gas tight annular contact with a valve seat 35 formed in the top of a neck member 36 extending inward from the valve body wall on the outlet side of the valve and centrally bored to form a guide through which the thermostatic rod 4 passes into the valve body 1. The neck member 36 is slightly smaller in diameter than the valve port 34 and is concentric therewith. The opening between the neck member 36 and the wall of the port 34 forms a gas passage between the inlet and outlet side of the valve body, which may be closed or opened when the clicker disk is actuated.

It will be noted that the amplification levers 11 illustrated in Fig. 1 have been eliminated and that amplification is attained by having the annular shoulder 10 of the plunger 9 make line contact with the convex side of the clicker disk in a circle of a radius slightly less than that of the clicker disk. Pressure on the convex side of the disk by the plunger causes the disk to snap into a reverse form and close the valve port. When the plunger has moved inward far enough to snap the clicker disk the edge of the plunger makes contact with an annular shoulder 32 in the inner wall of the valve body which stops any further movement of the plunger, after which the disk spring 8 compresses to allow for any additional inward movement of the cup member 7. The operation of this valve is the same as that described for the valve illustrated in Fig. 1. The plunger 9 has a plurality of holes 31 passing therethrough to permit the passage of the gas from the inlet side to the valve port 34. Leakage of gas through the plug 27 around the adjustment sleeve 6 is prevented by a packing gland 30 around the sleeve which is kept tight by a nut 29.

It is believed that the foregoing description conveys a clear understanding of the objects and advantages of my invention. While I have illustrated and described the advantages and application thereof to thermostatic valves I anticipate numerous other possible applications. All legitimate modifications and applications of my invention are therefore to be construed as coming within the scope and spirit of the appended claims.

I claim:

1. In a thermostat, the combination of a thermal responsive element arranged to have movement in event of temperature variation, an adjustment member operated thereby, means arranged to amplify any movement of said adjustable member, a valve or other element arranged to be actuated by said amplification means, means to limit the movement of said valve or other element, and yielding means intermediate said adjustment member and said valve or other element which will permit movement of said adjustment member after said valve or other element has been actuated by said adjustment member to its limit.

2. In a thermostatic device of the character described, the combination with a thermostatic element arranged to move according to temperature variations and a valve or other element adapted to be operated, of means between said element and said valve for communicating closing movement from the former to the latter, said means including an intermediate resilient means permitting further movement of said thermostatic element after said valve or other element is closed, said resilient means being of a form having an initial maximum resistance when said further movement is started and a decreasing resistance as said further movement continues.

3. In a thermostat, the combination of a valve or other element to be operated, a thermal responsive element adapted for movement in the event of a temperature change, snap-action means for operating the valve from one position to another and adapted when given a predetermined movement to cause the abrupt movement of the valve, means to limit the movement of the valve or other element, and an operating connection between the thermal responsive element and the snap-action means constructed so as to communicate the predetermined limited movement to the snap-action means in a predetermined movement of the thermal responsive element, and permit of further movement of said element without corresponding movement of the snap-action means.

4. In a thermostat, the combination of a body-member, a valve therein to be operated, a tube having a rod mounted therein to form a thermostat, the tube being fixed with respect to the body in concentric relation to the valve and arranged to communicate endwise movement to the rod in the event of temperature change, a spring diaphragm disk of substantially convexo-concave form mounted on the body in concentric relation to the valve, the valve being normally in one position and said disk being arranged to move the same abruptly to another position, a push member concentrically disposed with respect to the disk and arranged when moved by the rod to snap the disk over dead center for abrupt operation of the valve, means for limiting movement of the valve, and resilient means providing an operation connection between the rod and the push member permitting additional movement of the thermostat after the limited movement of said valve.

5. A device as set forth in claim 4 wherein the limiting means positively limits the movement of the push member toward the disk to prevent damaging the disk, the resilient means between the rod and the push member being arranged to permit movement of the rod independently of the push member when the latter is held against movement.

6. A device as set forth in claim 4, wherein the valve is provided directly on the disk.

7. A device as set forth in claim 4, wherein the valve is provided directly on the disk and surrounds a central opening provided in said disk, the body member having inlet and outlet passages communicating with the opposite sides of the disk, said passages being thrown into communication through the central opening in said disk when the valve is open.

8. In a thermostat, the combination of a body member, a tube having a rod mounted therein to form a thermostat, the tube being fixed with respect to the body and arranged to communicate endwise movement to the rod upon temperature change, a valve in said body concentric with the rod and having the latter extending therethrough, a spring diaphragm disk of substantially convexo-concave form supported on the body in concentric relation with the rod and also having the latter extending therethrough, said valve being normally in one position but arranged to be moved abruptly to another position by said disk, a push member for cooperation with said disk to snap the same over dead center, the same being disposed concentric with the rod and also having the latter extending therethrough, and resilient means providing an operating connection between the rod and the back of the push member.

9. In a thermostat, the combination of a body member, a tube having a rod mounted therein to form a thermostat, the tube being fixed with respect to the body and arranged to communicate endwise movement to the rod upon temperature change, a valve in said body concentric with the rod and having the latter extending therethrough, a spring diaphragm disk of substantially convexo-concave form supported on the body in concentric relation with the rod and also having the latter extending therethrough, said valve being normally in one position but arranged to be moved abruptly to another position by said disk, a push member for cooperation with said disk to snap the same over dead center, the same being disposed concentric with the rod and also having the latter extending therethrough, a temperature adjustment member threaded on the rod behind the push member, and resilient means between said adjustment member and the push member.

10. A thermostat as set forth in claim 8, including means for limiting the movement of the push member toward the disk to prevent damaging the disk, the resilient means permitting movement of the rod independently of the push member when the latter is held against movement.

11. A thermostat as set forth in claim 9, including means for limiting the movement of the push member toward the disk to prevent damaging the disk, the resilient means permitting movement of the rod independently of the push member when the latter is held against movement.

12. A thermostat as set forth in claim 8, wherein the resilient means comprises a spring diaphragm disk of substantially convexo-concave form having abutment about its circumference with the back of the push member and arranged to have movement communicated thereto by the rod at the center thereof.

13. A thermostat as set forth in claim 9, wherein the resilient means comprises a spring diaphragm disk of substantially convexo-concave form having abutment about its circumference with the back of the push member and arranged to have movement communicated thereto by the rod at the center thereof by engagement of the adjustment member therewith.

14. A thermostat as set forth in claim 8, wherein the valve is provided directly on the disk.

15. A thermostat as set forth in claim 8, wherein the valve is provided directly on the disk and surrounds an opening provided in the center of said disk, the body member being provided with inlet and outlet passages communicating with opposite sides of the disk, said passages being placed in communication through said opening when the valve is open.

16. In a thermostat, the combination of a body member, a tube having a rod mounted therein to form a thermostat, the tube being fixed with respect to the body and arranged to communicate endwise movement to the rod upon temperature change, a spring diaphragm disk of substantially convexo-concave form mounted on the body in concentric relation with the rod and having the latter extended therethrough, a valve provided directly on the disk at the center thereof and serving to control communication between inlet and outlet passages provided in the body member, and a push member concentrically disposed with respect to the disk and rod and operated by the latter to force the disk to snap over dead center when the rod is given a predetermined movement.

17. In a thermostat, the combination of a body member, a tube having a rod mounted therein to form a thermostat, the tube being fixed with respect to the body and arranged to communicate endwise movement to the rod upon temperature change, a spring diaphragm disk of substantially convexo-concave form mounted on the body in concentric relation with the rod, a push member for moving the disk over dead center with snap action, said push member being operated by the rod, and a valve provided directly on the disk and serving to control communication between inlet and outlet passages provided in the body member.

18. In a thermostatic device of the character described, the combination with a thermostat comprising rod and tube elements, one of said elements being arranged to move according to temperature changes, of a casing, a snap action element of spring material, means for supporting said element for operation by the thermostatic element, said snap action element being normally disposed on one side of its dead center but arranged when moved past dead center to snap to reversed position, means operable by the thermostatic element for communicating amplified movement to said snap action element, whereby to cause snap action thereof in a predetermined movement of the thermostatic element and a valve for controlling communication between inlet and outlet passages provided in said casing, said valve being carried directly by the snap action element so as as to be bodily movable therewith abruptly from one position to another.

19. In a thermostatic device of the character described, the combination with a thermostatic element arranged to move according to temperature changes, of a casing, a snap action disk of spring material, means for supporting said disk about the edge thereof for operation by the thermostatic element, said disk being disposed normally on one side of its dead center but arranged when moved past dead center to snap to reversed position, a valve seat in the casing substantially concentric with said disk, and a valve carried on the central portion of said disk for movement toward and away from the valve seat in the snap action and return movements of said disk.

20. In a thermostatic device of the character described, the combination with a thermostatic element arranged to move according to temperature changes, of a casing, a snap action disk of spring material, means for supporting said disk about the edge thereof for operation by the thermostatic element, a valve carried on the central portion of said disk for movement back and forth in said casing from one limit position to another whereby to control communication between inlet and outlet passages in said casing, said disk being normally substantially convexo-concave in form and serving to return and hold said valve accordingly in one limit position, said disk being adapted when forced past dead center to snap to reversed position whereby to accordingly abruptly move the valve to its other limit position.

21. In a thermostatic device of the character described, the combination with a thermostat comprising rod and tube elements, one of said elements being arranged to move according to temperature changes, of a casing, a snap action element of spring material, means for supporting said element for operation by the thermostatic element, a valve carried directly on the snap action element for movement back and forth in said casing abruptly from one limit position to another whereby to control communication between inlet and outlet passages in said casing, said snap action element being normally disposed on one side of its dead center and serving to return and hold said valve accordingly in one limit position, said snap action element being adapted when forced past dead center to snap to reversed position whereby to accordingly abruptly move the valve to its other limit position, and means operable by the thermostatic element for communicating amplified movement to said snap action element, whereby to cause snap action thereof in a predetermined movement of the thermostatic element.

22. In a thermostatic device of the character described, the combination with a thermostatic element arranged to move according to temperature changes, of a casing, a snap action disk of spring material, means for supporting said disk about the edge thereof in the casing for operation by said thermostatic element, said disk being disposed in said casing between an inlet and an outlet passage and being perforated to permit flow of fluid through the disk from the one passage to the other, and a valve carried on the central portion of said disk for movement therewith back and forth in the casing to control communication between the inlet and outlet passages, said disk being normally disposed on one side of its dead center to hold the valve in one position but being arranged when moved past dead center to snap to reversed position and accordingly move the valve to another position.

23. In a thermostatic device of the character described, the combination with a thermostat comprising rod and tube elements, one of said elements being arranged to move according to temperature changes, of a casing, a snap action element of spring material, means for supporting said element in said casing for operation by the thermostatic element, said snap action element being disposed in the casing between an inlet and an outlet passage but being constructed so as to permit flow of fluid thereby from the inlet to the outlet passage, a valve carried directly by the snap action element for movement back and forth in the casing to control communication between said passages, said snap action element being normally disposed on one side of its dead center holding the valve in one position but adapted when moved past dead center to snap to reversed position and accordingly move the valve to another position, and means operable by the thermostatic element for communicating amplified movement to said snap action element, whereby to cause snap action thereof in a predetermined movement of the thermostatic element.

SIDNEY P. VAUGHN.